US012233567B2

(12) United States Patent
Nasu

(10) Patent No.: US 12,233,567 B2
(45) **Date of Patent: *Feb. 25, 2025**

(54) CUTTING SYSTEM

(71) Applicant: BROTHER KOGYO KABUSHIKI KAISHA, Nagoya (JP)

(72) Inventor: Shota Nasu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,252

(22) Filed: Aug. 29, 2023

(65) Prior Publication Data

US 2023/0398709 A1 Dec. 14, 2023

Related U.S. Application Data

(63) Continuation of application No. 17/025,631, filed on Sep. 18, 2020, now Pat. No. 11,787,077, which is a (Continued)

(30) Foreign Application Priority Data

Mar. 20, 2018 (JP) ................................ 2018-052525

(51) Int. Cl.
*B26D 7/26* (2006.01)
*B26D 1/38* (2006.01)
(Continued)

(52) U.S. Cl.
CPC ........... *B26D 7/2614* (2013.01); *B26D 1/385* (2013.01); *B41J 11/706* (2013.01); *B41J 15/042* (2013.01); *B26D 2210/11* (2013.01)

(58) Field of Classification Search
CPC ........ B26D 7/2614; B26D 1/04; B26D 2/385; B26D 7/06; B26D 2210/11; B26D 5/00;
(Continued)

(56) References Cited

U.S. PATENT DOCUMENTS 2,605,926 A 8/1952 Casey
2,677,479 A 5/1954 Kiba
(Continued)

FOREIGN PATENT DOCUMENTS

JP A-H07-330194 A 12/1995
JP H08-052914 A 2/1996
(Continued)

OTHER PUBLICATIONS

International Search Report issued in connection with PCT/JP2019/009311, dated May 21, 2019.
(Continued)

*Primary Examiner* — Ghassem Alie
(74) *Attorney, Agent, or Firm* — K&L Gates LLP

(57) ABSTRACT

A cutting system has a processing machine and a sheet cutter which selectively attaches to the processing machine. The processing machine includes a conveying mechanism, a processing unit, and a lid. The conveying mechanism is configured to convey the sheet. The processing unit is configured to process the sheet conveyed by the conveying mechanism. The lid is configured to open and close a conveyance path through which the sheet is conveyed. The sheet cutter includes a main body, a cutting unit attached to the main body and including a cutter slidable in a first direction, the cutting unit being configured to cut, along in the first direction, the sheet with the cutter, and an attacher configured to attach the main body to the processing machine. In a case where the main body is attached to the processing machine, the main body is positioned relative to the lid.

9 Claims, 6 Drawing Sheets

Related U.S. Application Data continuation of application No. PCT/JP2019/009311, filed on Mar. 8, 2019.

(51) Int. Cl.
*B41J 11/70* (2006.01)
*B41J 15/04* (2006.01)

(58) Field of Classification Search
CPC .......... B26D 7/006; B26D 7/00; B26D 1/245; B26D 1/185; B26D 5/02; B41J 15/042; B41J 11/706; B41J 11/66; B65H 35/04
USPC .................................... 83/156, 614; 400/621
See application file for complete search history.

(56) References Cited

U.S. PATENT DOCUMENTS

| | | | | |
|---|---|---|---|---|
| 2,734,222 | A | 2/1956 | Kiba | |
| 3,971,279 | A * | 7/1976 | Wright | B26D 1/035 83/649 |
| 4,754,674 | A * | 7/1988 | Perlman | B65H 35/0086 83/649 |
| 5,146,650 | A | 9/1992 | Robertson | |
| 5,765,460 | A * | 6/1998 | Wathieu | B26D 5/34 83/37 |
| 5,815,186 | A | 9/1998 | Lewis et al. | |
| 6,772,666 | B2 * | 8/2004 | Heil | A47F 13/085 83/485 |
| 6,918,508 | B2 | 7/2005 | Hwang | |
| 7,124,471 | B2 | 10/2006 | Koessler | |
| 7,395,640 | B1 * | 7/2008 | Wang | B65B 41/12 83/649 |
| 8,908,075 | B2 | 12/2014 | Silverbrook | |
| 9,682,328 | B2 | 6/2017 | Yang et al. | |
| D802,657 | S | 11/2017 | Umezawa et al. | |
| 2002/0051669 | A1 | 5/2002 | Otsuka et al. | |
| 2004/0037606 | A1 | 2/2004 | Tsuchiya et al. | |
| 2005/0186010 | A1 * | 8/2005 | Shibata | B26F 1/3813 400/621 |
| 2005/0281606 | A1 | 12/2005 | Koyama et al. | |
| 2007/0102391 | A1 | 5/2007 | Hoepner et al. | |

FOREIGN PATENT DOCUMENTS

| | | | |
|---|---|---|---|
| JP | H08-132786 | A | 5/1996 |
| JP | 2002-240396 | A | 8/2002 |
| JP | 2004-074622 | A | 3/2004 |
| JP | 2004-090255 | A | 3/2004 |
| JP | 2006-188068 | A | 7/2006 |
| JP | D1515569 | S | 1/2015 |
| JP | 2017-124525 | A | 7/2017 |

OTHER PUBLICATIONS

International Preliminary Report on Patentability issued in connection with PCT Application No. PCT/JP2019/009311 mailed Sep. 22, 2020.

* cited by examiner

CUTTING SYSTEM

REFERENCE TO RELATED APPLICATIONS

This application is a continuation of U.S. patent application Ser. No. 17/025,631, filed Sep. 18, 2020, which is a continuation application of International Application No. PCT/JP2019/009311 filed on Mar. 8, 2019 which claims priority from Japanese Patent Application No. 2018-052525 filed on Mar. 20, 2018. The contents of the aforementioned applications are incorporated herein by reference in their entirety.

BACKGROUND ART

Technical Field

Aspects of the disclosure relate to a cutting system having processing machine and a sheet cutter which selectively attaches to the processing machine.

Background

Processing machines are used with machines to supply objects to be processed to the processing machines. The processing machines include a cutting machine which is used with a supply machine to supply an object or sheet to be cut to the cutting machine. A known supply machine is attached to feet of a processing machine, which are a base at its bottom, to be positioned relative to the processing machine.

DESCRIPTION

Summary

However, the feet at the bottom of the processing machine may not be arranged accurately along in a direction orthogonal to a sheet conveying direction. This may fail to position sheets to be accurately supplied to the processing machine along in the direction orthogonal to the sheet conveying direction. Thus, a sheet may be supplied askew from the supply machine to the processing machine.

Aspects of the disclosure provide a cutting system to reduce the likeliness that a sheet to be fed to a processing machine is conveyed askew.

According to aspects of the disclosure, a cutting system has a processing machine and a sheet cutter which selectively attaches to the processing machine. The processing machine includes a conveying mechanism, a processing unit, and a lid. The conveying mechanism is configured to convey the sheet. The processing unit is configured to process the sheet conveyed by the conveying mechanism. The lid is configured to open and close a conveyance path through which the sheet is conveyed. The sheet feeder includes a main body, a cutting unit, and an attacher. The cutting unit is attached to the main body and includes a cutter slidable in the first direction. The cutting unit is configured to cut, along in the first direction, the sheet with the cutter. The attacher is configured to attach the main body to the processing machine. In a case where the main body is attached to the processing machine, the main body is positioned relative to the lid.

DETAILED DESCRIPTION

Figure 1:
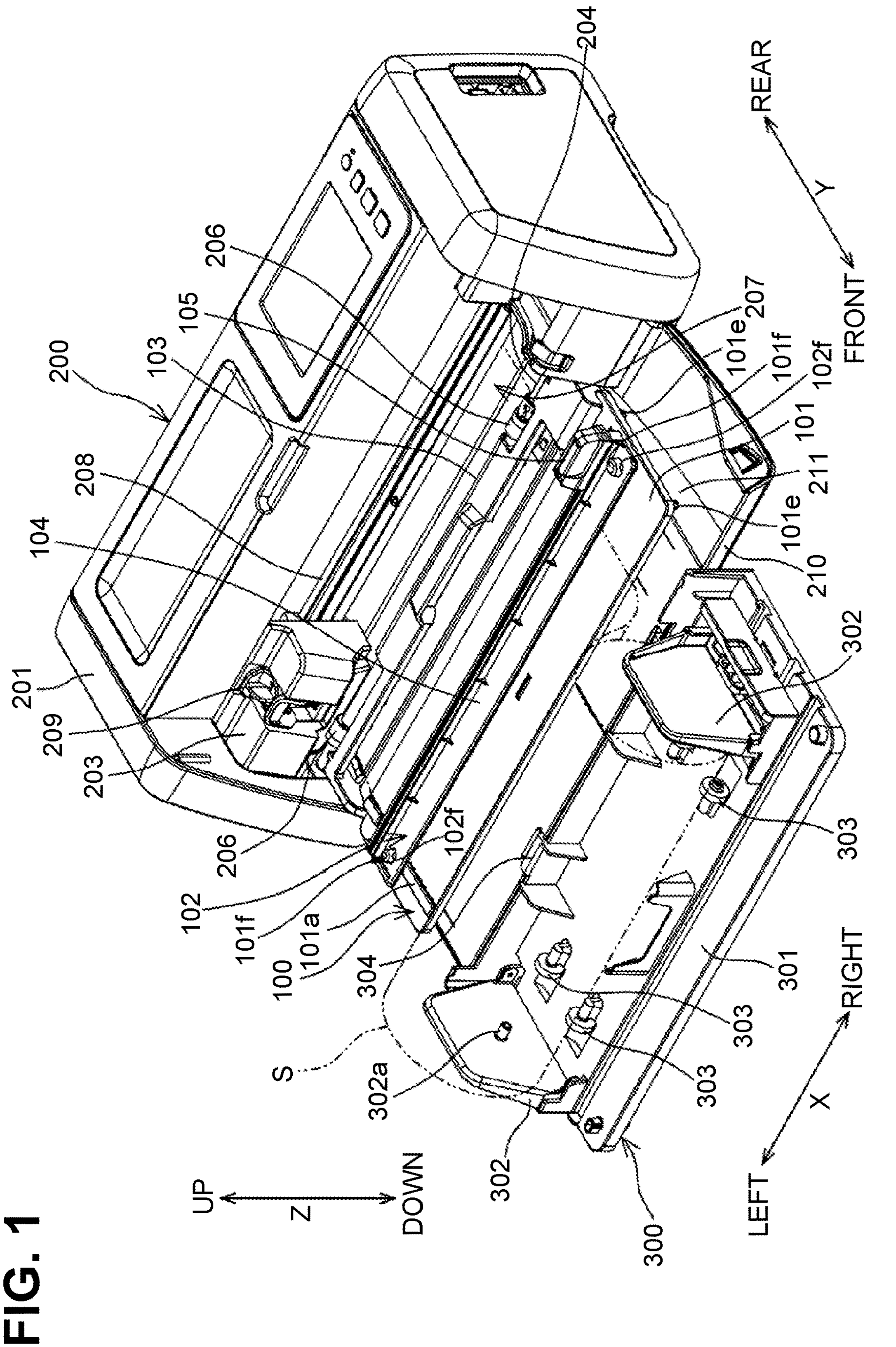
FIG. 1 is a perspective view of a sheet feeder and a cutting machine according to an illustrative embodiment of the disclosure.

An illustrative embodiment of the disclosure will be described with reference to drawings. The directions referred to the following description are illustrated in the drawings, in which an X direction is defined as a left-right direction, which is an example of a first direction, a Y direction is defined as a front-rear direction, which is an example of a second direction, and a Z direction is defined as an up-down direction, which is an example of a third direction. The Y direction corresponds to a conveying direction in which a sheet S to be processed is conveyed. The Y direction is orthogonal to the X direction and the Z direction is orthogonal to both the X and Y directions. A left end is an example of one end in the first direction, a right end is an example of the other end in the first direction, a rear end is an example of one end in the second direction, a front end is an example of the other end in the second direction, an upper end is an example of one end in the third direction, and a lower end is an example of the other end in the third direction.

Figure 2:
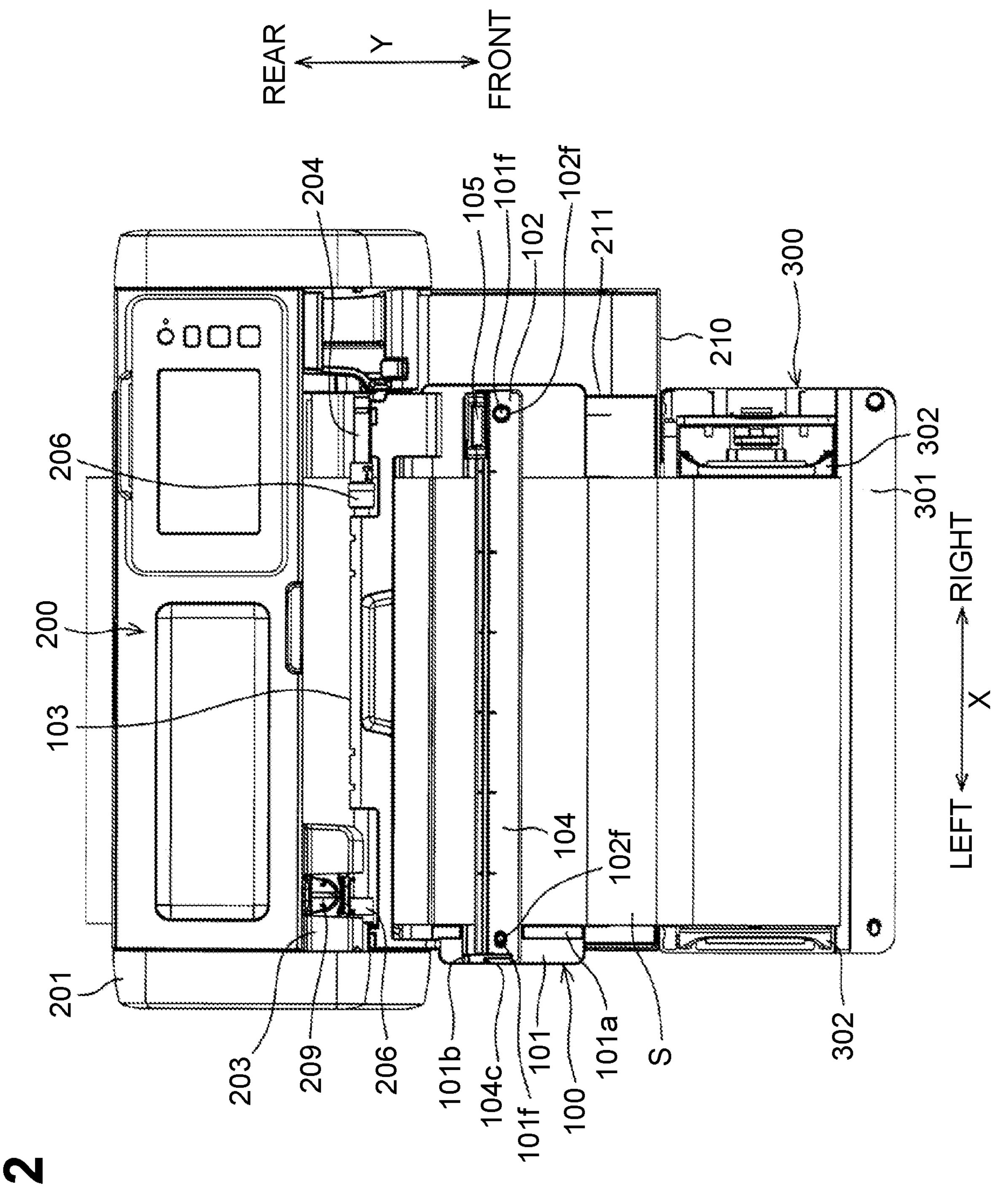
FIG. 2 is a plan view of the sheet feeder and the cutting machine according to the illustrative embodiment of the disclosure.

A cutting machine 200 illustrated in FIGS. 1 and 2, which is an example of a processing machine, is configured to process or specifically cut a sheet S to be fed from a sheet feeder 100. The cutting machine 200 includes a body case 201 constituting the outer wall of the cutting machine 200, a conveying mechanism 202, and a processing unit 203.

Figure 3:
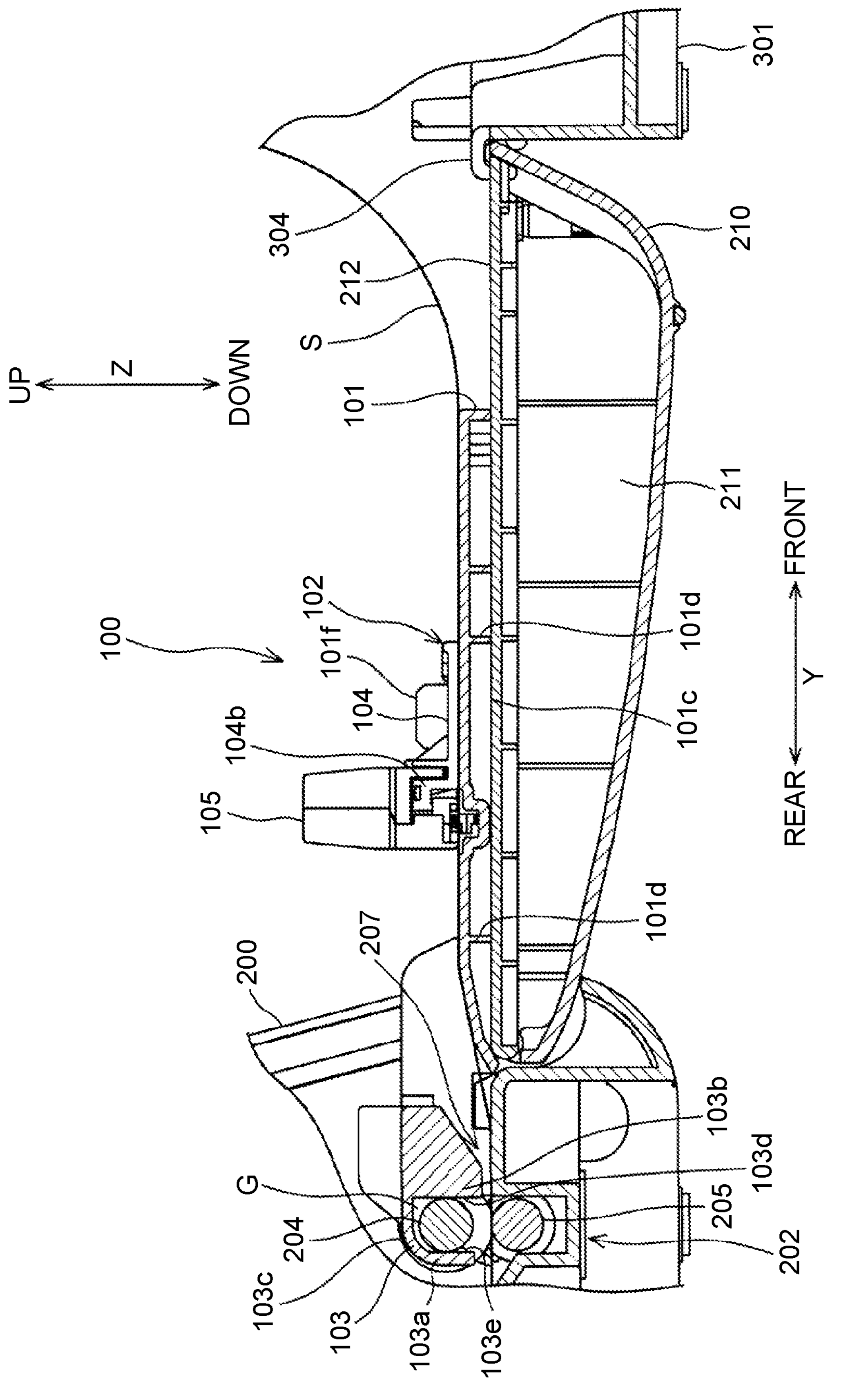
FIG. 3 is a partial longitudinal sectional view of the sheet feeder attached to the cutting machine according to the illustrative embodiment of the disclosure.

As illustrated in FIG. 3, the conveying mechanism 202 includes a driven roller 204 extending in the left-right direction, a drive roller 205 located below and paired with the driven roller 204, and a drive motor to rotate the drive roller 205. The driven roller 204 is an example of a shaft and extends linearly in the left-right direction inside of the body case 201. Small rollers 206 are provided on the driven roller 204. In the embodiment, two small rollers 206 are provided on left and right sides of the driven roller 204. The drive roller 205 is located below the driven roller 204 and extends linearly in the left-right direction inside of the body case 201. The driven roller 204 is movable in the up-down direction, and is urged downward or toward the drive roller 205 by an urging member such as a spring. The driven roller 204 is thus configured to move up or down according to the thickness of sheet S to be fed.

The cutting machine 200 defines a conveyance path 207, which extends in the front-rear direction, between the driven roller 204 and the drive roller 205. The conveying mechanism 202 allows the drive roller 205 to rotate by the drive motor, thereby conveying the sheet S, which is nipped between the driven roller 204 and the drive roller 205, in the conveyance path 207 along in the front-rear direction which is the conveying direction. At this time, the sheet S comes in contact with the small rollers 206, rather than the driven roller 204 itself. More specifically, the sheet S is conveyed along in the front-rear direction in a state nipped between the small rollers 206 of the driven roller 204 and the drive roller 205. The small rollers 206 are not fixed to the driven roller 204. During conveyance of the sheet S, the small rollers 206 may rotate integrally with or independently of the driven roller 204.

The processing unit 203 is slidably movable along a rail 208 extending linearly in the left-right direction. The processing unit 203 is configured to receive a detachable cutter cartridge 209. The cutter cartridge 209 is movable in the up-down direction in a reciprocating manner relative to the processing unit 203. The processing unit 203 moves the cutter cartridge 209 in the left-right direction and moves the cutter cartridge 209 in the up-down direction in a reciprocating manner, thus performing cutting operation on the sheet S conveyed by the conveying mechanism 202. The cutting operation, which is different from that of the sheet feeder 100 to be described later, includes cutting a desired shape out from a sheet S and making perforations along a desired shape in a sheet S.

Figure 4:
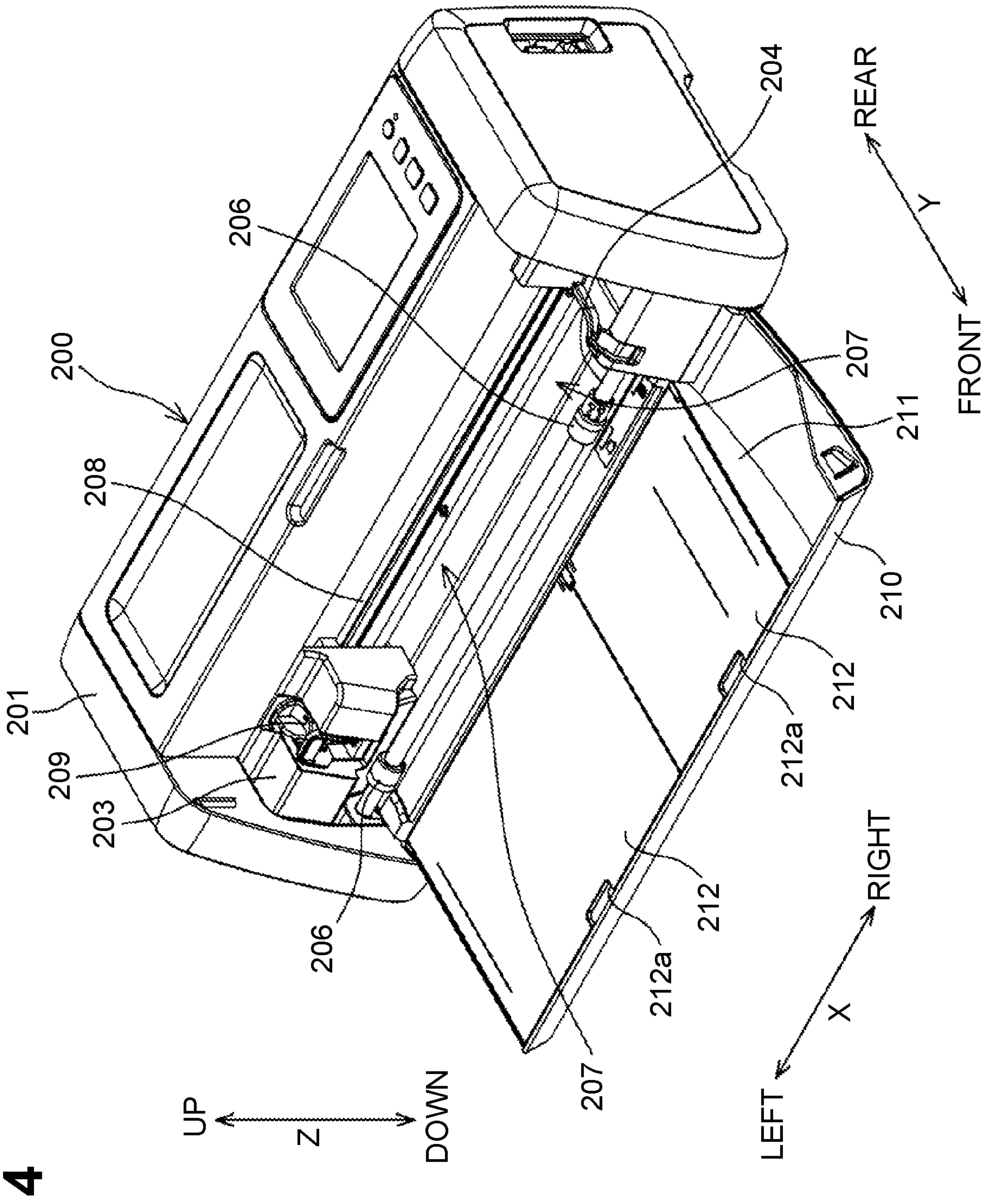
FIG. 4 is a perspective view of the cutting machine according to the illustrative embodiment of the disclosure.

As illustrated in FIG. 4, the cutting machine 200 includes a lid 210 for opening and closing the conveyance path 207. The lid 210 is pivotable about a front end of the conveyance path 207 in the front-rear direction. The lid 210 is pivotable between a blockage position where the lid 210 is located substantially perpendicular to the front of the cutting machine 200 to block the conveyance path 207, and a release position where the lid 210 is located substantially horizontally at the front of the cutting machine 200 to release the conveyance path 207.

The lid 210 includes a storage 211 on its inner or upper side when pivoted to the release position. The storage 211 is provided with a plurality of, for example, two, of openable flat small lids 212 to accommodate small articles such as a pen. The small lids 212 each have a cut 212*a* on their ends such that a user can easily open each small lid 212 with a finger inserted in the cut 212*a*. When the lid 210 is pivoted to the release position, the small lids 212 of the storage 211 define a horizontal flat surface extending in the left-right direction and the front-rear direction and orthogonally to the up-down direction.

The configuration of the sheet feeder 100 will be described. The sheet feeder 100 is configured to feed a sheet S to be processed to the cutting machine 200. The sheet feeder 100 includes a main body 101, a cutting unit 102, and an attaching portion 103. The main body 101 has a rectangular plate shape elongated in the left-right direction. The main body 101 includes a sheet guide 101*a*. The sheet guide 101*a* is located to a left end of the main body 101, protrudes upward from an upper surface of the main body 101, and extends linearly in the front-rear direction. The sheet S comes in contact with the right side of the sheet guide 101*a* to be positioned in the left-right direction.

As illustrated in FIG. 2, the main body 101 includes a stopper 101*b* protruding upward. The stopper 101*b* is located closer to the left end of the main body 101 than the sheet guide 101*a*.

The main body 101 is attached to the lid 210 of the cutting machine 200, which is pivoted to the release position. In this case, the main body 101 is attached to the storage 211 of the lid 210 pivoted to the release position. As illustrated in FIG. 3, the main body 101 has a lower surface 101*c* which is defined by ribs 101*d* with their lower ends flush with each other. The main body 101 is placed down on the flat surface defined by the small lids 212 covering the storage 211 of the lid 210, so that the lower end faces of the ribs 101*d* contact the flat surface defined by the small lids 212 from above the flat surface. This enables positioning of not only the main body 101 but also a whole of the sheet feeder 100 in the up-down direction. The lower surface 101*c* of the main body 101 functions as an example of a third direction positioning portion configured to position the main body 101, which is attached to the cutting machine 200, in the up-down direction.

As illustrated in FIG. 1, the main body 101 includes, on its lower surface, a plurality of, for example, four, guide portions 101*e* protruding downward. In this case, the guide portions 101*e* are located two at each of left and right ends of the lower surface of the main body 101 and separately in the front-rear direction. When the main body 101 is attached to the storage 211 of the lid 210, the guide portions 101*e* are in contact with left and right side surfaces of the storage 211. As the storage 211 is sandwiched between the left and right guide portions 101*e*, the main body 101 is positioned in the left-right direction relative to the storage 211 of the lid 210. In other words, the guide portions 101*e* function as a first direction positioning portion configured to position the main body 101 relative to the lid 210 in the left-right direction.

Figure 5:
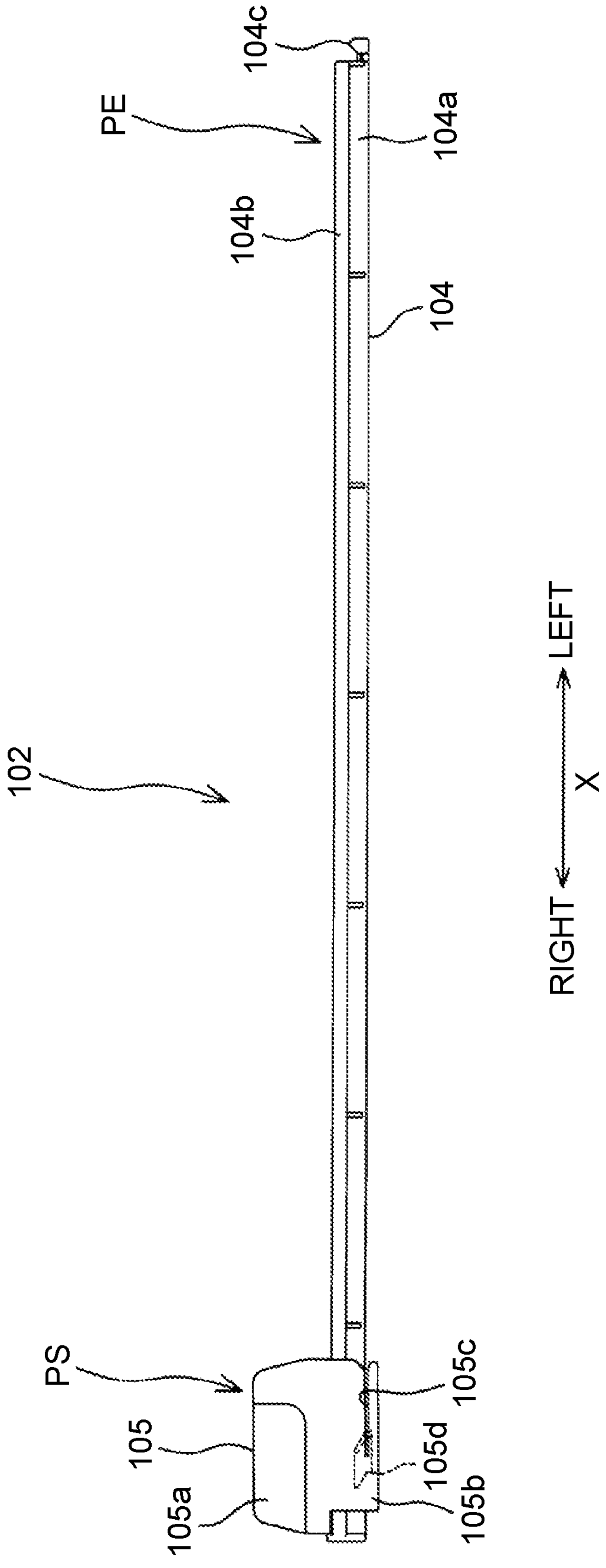
FIG. 5 is a rear view of a cutting unit of the sheet feeder according to the illustrative embodiment of the disclosure.

The cutting unit 102 is detachably attached to and above the main body 101. As illustrated in FIG. 5, the cutting unit 102 includes a cutter plate 104 extending linearly in the left-right direction and a cutter 105 slidably movable along the cutter plate 104 in the left-right direction. The cutter plate 104 has a plate body portion 104*a* and a rail portion 104*b* which area integral with each other. The plate body portion 104*a* has a rectangular plate shape elongated in the left-right direction. The rail portion 104*b* is located on an upper surface of the plate body portion 104*a* and extends linearly in the left-right direction. When the cutting unit 102 is attached to the main body 101 and the main body 101 is attached to the cutting device 200 by the attaching portion 103 described later, the rail portion 104*b* is located extending orthogonally to the conveying direction of the sheet S. The cutter 105 is held in the rail portion 104*b* so that the cutter 105 is slidable linearly in the left-right direction. As illustrated in FIG. 1, the main body 101 has protrusions 101*f* protruding from its upper surface in the up-down direction, and the cutting unit 102 has holes 102*f* penetrating the cutter plate 104 in the up-down direction. The cutting unit 102 is attached to and above the main body 101 by engaging the holes 102*f* with the protrusions 101*f* of the main body 101. The protrusions 101*f* of the main body 101 and holes 102*f* of the cutting unit 102 are located such that the rail portion 104*b* is parallel to the driven roller 204 when the cutting unit 102 is attached to the main body 101.

The cutter 105 is substantially rectangular when viewed in the front-rear direction, and has a grip 105*a* to be grasped by a user in its upper portion and a cutting function portion 105*b* in its lower portion. The cutting function portion 105*b* has a slit 105*c* extending from its left end to its right end. The cutter 105 includes a blade 105*d* in a deep recess of the slit 105*c*, which is at the right end in this case. The blade 105*d* has an edge facing to the left end. The cutting unit 102 has a cutting start position PS set at its right end, and a cutting end position PE set at its left end. The cutting start position PS of the cutting unit 102 attached to the main body 101 is set at a position closer to the right end of the main body 101 than the sheet guide 101*a*. The cutting end position PE of the cutting unit 102 attached to the main body 101 is set at a position closer to the left end of the main body than the cutting start position PS. More specifically, the cutting end position PE of the cutting unit 102 attached to the main body 101 is set at a position where the blade 105*d* is at a position closer to the left end of the main body 101 than the right end of the sheet guide 101*a*.

The cutter plate 104 has a retaining portion 104*c*. The retaining portion 104*c* is disposed at the left end of the cutter plate 104 and protrudes upward. The retaining portion 104*c* is disposed so as to overlap the rail portion 104*b* in the front-rear direction. The retaining portion 104*c* is configured to contact the cutter 105 slidingly moved to the left end to prevent the cutter 105 from coming off from the rail portion 104*b* of the cutter plate 104. The retaining portion 104*c* has a function to prevent the cutter 105 from coming off from the cutter plate 104 when the cutting unit 102 is detached from the main body 101.

To cut a sheet S fed to the cutting machine 200, a user places a sheet S on the upper surface of the main body 101, and then attaches the cutting unit 102 to and above the main body 101 with the sheet S therebetween. In this state, the cutting unit 102 linearly cuts the sheet S on the main body 101 along in the left-right direction with the cutter 105 slidingly moved from the cutting start position PS to the cutting end position PE by the user. In contrast with the cutting machine 200, the cutting unit 102 linearly cuts an end of the sheet S, which is fed in the conveyance path 207 of the cutting machine 200, across its width along in the left-right direction, which is an extending direction of the driven roller 204. This aligns the end of the sheet S on the cutting machine 200 with the extending direction of the driven roller 204 to reduce skewing of the sheet S. The sheet S, which is inserted into the conveyance path 207 by a user, comes in contact with the small rollers 206 of the driven roller 204 substantially simultaneously, which reduces the likeliness that the sheet S is conveyed askew.

As illustrated in FIG. 2, when the sheet feeder 100 with the cutting unit 102 attached to and above the main body 101 is viewed from above, the retaining portion 104*c* is located further to the left than the right end surface of the stopper 101*b*, and the cutter 105 is located further to the right than the right end surface of the stopper 101*b*. Due to this positional relationship, when the user slides the cutter 105 from the right end toward the left end, the cutter 105 comes in contact with the right end surface of the stopper 101*b* prior to the retaining portion 104*c*. This restricts the cutter 105 from moving further to the left.

A sheet holder 300 is detachably attached to the cutting machine 200. The sheet holder 300 includes a main body 301 having a rectangular plate shape elongated in the left-right direction, and a pair of sheet holding plates 302 located on both ends of the main body 301 in the left-right direction. The sheet holding plates 302 at both left and right ends of the main body 301 are pivotable inward or outward. The sheet holding plates 302 are each pivotable between a vertical position vertical to the main body 301 and a parallel position parallel to the main body 301. The sheet holding plates 302 have inner surfaces facing each other when at the vertical positions, and the inner surfaces are provided with holding shafts 302*a* protruding linearly in the left-right direction.

When the sheet holder 300 is not in use, the sheet holding plates 302 are pivoted inward to the parallel positions to make the sheet holder 300 compact. When the sheet holder 300 is in use, the sheet holding plates 302 are pivoted outward to the vertical positions to hold a rolled sheet S rotatably by the holding shafts 302*a*.

The main body 301 includes a plurality of, for example, four, auxiliary rollers 303 located between the sheet holding plates 302. A rolled sheet S held by the sheet holding plates 302 is supported by the auxiliary rollers 303 from below. The main body 301 has two hooks 304 at its rear end. The sheet holder 300 is detachably attached to the lid 210 of the cutting machine 200 by engaging the hooks 304 in the cuts 212*a* of the lid 210 from above.

The configuration of the attaching portion 103 will be described. The attaching portion 103 is used to attach the main body 101 of the sheet feeder 100 to the cutting machine 200. As illustrated in FIG. 3, the attaching portion 103 is attached to the driven roller 204, which is one of structural components of the cutting machine 200 and extends linearly in the left-right direction of the cutting machine 200, thereby attaching the main body 101 of the sheet feeder 100 to the cutting machine 200. The attaching portion 103 is detachable. In the embodiment, the attaching portion 103 includes a rear restricting portion 103*a* which is located behind the driven roller 204 when the main body 101 is attached to the cutting machine 200. The attaching portion 103 includes a front restricting portion 103*b* which is located in front of the driven roller 204 when the main body 101 is attached to the cutting machine 200. The rear restricting portion 103*a* is an example of a first restricting portion, and the front restricting portion 103*b* is an example of a second restricting portion.

The attaching portion 103 defines a closed portion 103*c* where the rear restricting portion 103*a* and the front restricting portion 103*b* are connected to each other, and an open portion 103*d* where the rear restricting portion 103*a* and the front restricting portion 103*b* are spaced from each other. A distance between a front end of the rear restricting portion 103*a* and a rear end of the front restricting portion 103*b* in the front-rear direction is equal to or slightly greater than a diameter of the driven roller 204. The rear restricting portion 103*a*, the front restricting portion 103*b*, and the closed portion 103*c* are molded in resin. Due to elasticity of resin, the distance between the front end of the rear restricting portion 103*a* and the rear end of the front restricting portion 103*b* in the front-rear direction may slightly change by external forces. While the attaching portion 103 is attached to the driven roller 204, the rear restricting portion 103*a* and the front restricting portion 103*b* are elastically deformed against the driven roller 204 in the front-rear direction while being spaced apart and moved toward each other to sandwich the driven roller 204 in the front direction. In the embodiment, the attaching portion 103 has an upper end defining the closed portion 103*c* and a lower end defining the open portion 103*d*. This structure enables attaching of the attaching portion 103 to the driven roller 204 of the cutting machine 200 from above the driven roller 204 such that the driven roller 204 is received in the closed portion 103*c*.

In the embodiment, when the main body 101 is attached to the cutting machine 200, lower ends of the rear restricting portion 103*a* and the front restricting portion 103*b* are located below the center of the driven roller 204 in the up-down direction. The lower end of the front restricting portion 103*b* is located below the lower end of the driven roller 204 further than the lower end of the rear restricting portion 103*a*.

In the embodiment, the rear restricting portion 103*a* has an extension portion 103*e* located below the center of the driven roller 204 in the up-down direction. More specifically, the extension portion 103*e* is located closer to the lower end of the driven roller 204 than to the center thereof in the up-down direction. The extension portion 103*e* extends toward the driven roller 204 in the front-rear direction, or toward the front in this case. As the attaching portion 103 is attached to the driven roller 204 of the cutting machine 200, the distance between the rear restricting portion 103*a* and the front restricting portion 103*b* increases due to the elastic deformation of the rear restricting portion 103*a*, the front restricting portion 103*b*, and the closed portion 103_c_. The extension portion 103_e_ moves over the driven roller 204 from above to below the driven roller 204 in this case, and reaches a position closer to the lower end of the driven roller 204 than to the center thereof in the up-down direction.

When the main body 101 is attached to the cutting machine 200 and is positioned in the up-down direction by the lower surface 101_c_ of the main body 101, the attaching portion 103 defines a gap G between the lower surface of the closed portion 103_c_ and the upper surface of the driven roller 204, which face each other and are spaced from each other in the up-down direction. In other words, in the embodiment, a distance between the lower surface of the closed portion 103_c_ and the lower end of the rear restricting portion 103_a_ in the up-down direction is greater than the diameter of the driven roller 204. In the embodiment, a distance between the lower surface of the closed portion 103_c_ and the lower surface 101_c_ of the main body 101 in the up-down direction is greater than the diameter of the driven roller 204. The lower surface of the closed portion 103_c_ and the upper surface of the driven roller 204 are separated in the up-down direction to define the gap G.

According to the sheet feeder 100 described in the above embodiment, the main body 101 is attached to the cutting machine 200 in such a manner that the attaching portion 103 is attached to the driven roller 204 extending linearly in a direction orthogonal to the front-rear direction, which is the conveying direction of the sheet S. This enables attaching of the main body 101 of the sheet feeder 100 accurately along in the direction orthogonal to the conveying direction. According to the sheet feeder 100, in the main body 101 attached in the direction orthogonal to the conveying direction, the cutter 105 of the cutting unit 102 is slidable linearly in the left-right direction of the main body 101, which is the direction orthogonal to the conveying direction of the sheet S. This enables the cutter 105 of the cutting unit 102 to accurately cut a sheet S to be fed to the cutting machine 200, along in the direction orthogonal to the conveying direction, thus reducing the likeliness that an end of the sheet S close to the cutting machine 200 is skewed in the extending direction of the driven roller 204. This reduces the likeliness that the sheet S is fed askew to the cutting machine 200.

According to the sheet feeder 100, the attaching portion 103 includes the rear restricting portion 103_a_ which is located behind the driven roller 204 when the main body 101 is attached to the cutting machine 200. According to this configuration, the main body 101 can be attached to the cutting machine 200 stably such that the rear restricting portion 103_a_ is hooked onto the driven roller 204 from in front of the driven roller 204.

According to the sheet feeder 100, the attaching portion 103 includes the front restricting portion 103_b_ which is located in front of the driven roller 204 when the main body 101 is attached to the cutting machine 200. The attaching portion 103 defines the closed portion 103_c_ where the rear restricting portion 103_a_ and the front restricting portion 103_b_ are connected to each other, and the open portion 103_d_ where the rear restricting portion 103_a_ and the front restricting portion 103_b_ are spaced from each other. According to this configuration, the main body 101 can be attached to the cutting machine 200 stably such that the rear restricting portion 103_a_ and the front restricting portion 103_b_ sandwich the driven roller 204 therebetween from both sides in the front-rear direction.

As the attaching portion 103 defines the closed portion 103_c_ where the rear restricting portion 103_a_ and the front restricting portion 103_b_ are connected to each other, the configuration of the attaching portion 103 can be achieved such that the rear restricting portion 103_a_ and the front restricting portion 103_b_ are as an integral part, and thus the main body 101 can be attached to the cutting machine 200 more stably. As the attaching portion 103 defines the open portion 103_d_ where the rear restricting portion 103_a_ and the front restricting portion 103_b_ are spaced from each other, the driven roller 204 can be easily engaged through the open portion 103_d_ into the attaching portion 103.

According to the sheet feeder 100, the attaching portion 103 has the upper end defining the closed portion 103_c_ and the lower end defining the open portion 103_d_, and is configured to be attached to the driven roller 204 from above the driven roller 204 such that the driven roller 204 is received in the closed portion 103_c_. When the main body 101 is attached to the cutting machine 200, the lower ends of the rear restricting portion 103_a_ and the front restricting portion 103_b_ are located below the center of the driven roller 204 in the up-down direction. According to this configuration, the user can attach the main body 101 to the cutting device 200 from above, which facilitates attaching operation. When the main body 101 is attached to the cutting machine 200, the lower ends of the rear restricting portion 103_a_ and the front restricting portion 103_b_ are located below the center of the driven roller 204 in the up-down direction. This facilitates attaching of the attaching portion 103 to the driven roller 204 and reduces the likeliness that the attaching portion 103 comes off from the driven roller 204.

According to the sheet feeder 100, the rear restricting portion 103_a_ has the extension portion 103_e_ located closer to the lower end of the driven roller 204 than to the center thereof in the up-down direction. The extension portion 103_e_ extends toward the driven roller 204 or toward the front. According to this this configuration, the extension portion 103_e_ may remain hooked on the driven roller 204 until just before the attaching portion 103 comes off from the driven roller 204, thus reducing the likelihood that the attaching portion 103 comes off from the driven roller 204.

The sheet feeder 100 includes the lower surface 101_c_ to position the main body 101 attached to the cutting machine 200 in the up-down direction. The attaching portion 103 is configured such that, when the main body 101 is attached to the cutting machine 200 and is positioned in the up-down direction by the lower surface 101_c_, the lower surface of the closed portion 103_c_ and the upper surface of the driven roller 204 are spaced from each other in the up-down direction. According to this configuration, the gap G defined in the attaching portion 103 allows the driven roller 204 to move in the up-down direction when a rather thick sheet S is fed to the cutting machine 200, thus reducing the likeliness that the attaching portion 103 comes off from the driven roller 204 due to the movement of the driven roller 204 in the up-down direction.

According to the sheet feeder 100, the distance between the lower surface of the closed portion 103_c_ and the lower end of the rear restricting portion 103_a_ in the up-down direction is greater than the diameter of the driven roller 204. Thus, the attaching portion 103 defines the gap G sufficiently for the driven roller 204 to move in the up-down direction.

According to the sheet feeder 100, the distance between the lower surface of the closed portion 103_c_ and the lower surface 101_c_ of the main body 101 in the up-down direction is greater than the diameter of the driven roller 204. Thus, the attaching portion 103 defines the gap G sufficiently for the driven roller 204 to move in the up-down direction.

According to the sheet feeder 100, the main body 101 includes the sheet guide 101_a_ extending in the front-rear direction which is the conveying direction and configured to position the sheet S to be fed to the cutting machine 200 in the left-right direction. According to this configuration, a sheet S positioned in the left-right direction by contact with the sheet guide 101*a* can be cut accurately by the cutter 105 of the cutting unit 102.

According to the sheet feeder 100, the cutter 105 includes the blade 105*d* having an edge facing to the left. The cutting unit 102 is configured to cut a sheet S to be fed to the cutting machine 200 along in the left-right direction with the cutter 105 slidingly moved leftward from the cutting start position PS set at a position closer to the right end of the main body 101 than the sheet guide 101*a*. According to this configuration, a sheet S is positioned by the sheet guide 101*a* in the left-right direction, and cutting of the sheet S is started from the cutting start position PS set at a position closer to the right end of the main body 101 than the sheet guide 101*a*. This reduces misalignment of the sheet S in the left-right direction and thus enables accurate cutting.

According to the sheet feeder 100, the cutting unit 102 is detachable from the main body 101. According to this configuration, the cutting unit 102 can be attached to the main body 101 after a sheet S to be cut is placed on the upper surface of the main body 101. The cutting unit 102 can flexibly respond to cutting of different types of sheet S having different thickness and materials, for example. When the sheet feeder 100 is not in use, the cutting unit 102 can be removed from the main body 101 to be stored compactly. For the cutting unit 102 removed from the main body 101, maintenance such as cleaning and replacement of the blade 105*d* of the cutter 105 can be performed easily.

According to the sheet feeder 100, the cutting unit 102 includes the cutter plate 104 extending in the left-right direction which is a cutting direction, and the cutter 105 slidably movable in the left-right direction along the cutter plate 104. The cutter plate 104 includes, at its left end, the retaining portion 104*c* to prevent the cutter 105 from coming off from the cutter plate 104. The main body 101 includes the stopper 101*b* to restrict sliding of the cutter 105 on the cutter plate 104. The retaining portion 104*c* is located closer to the left end of the main body 101 than the stopper 101*b*, and the cutter 105 is located closer to the right end of the main body 101 than the stopper 101*b*. According to this configuration, the cutter 105, which is slid toward the left end of the cutter plate 104, is restricted by the stopper 101*b* just before contacting the retaining portion 104*c*. This reduces the likeliness that the retaining portion 104*c* is broken by the cutter 105 which is slid quickly.

According to the sheet feeder 100, the cutting machine 200 includes the lid 210 to open and close the conveyance path 207 through which the sheet S is conveyed. The main body 101 of the sheet feeder 100 includes the guide portions 101*e* to position the main body 101 relative to the lid 210 in the left-right direction. According to this configuration, the main body 101 is positioned in the left-right direction relative to the cutting machine 200. This reduces misalignment of the sheet S in the left-right direction, and thus enables accurate cutting.

The main body 101 is positioned in the left-right direction by the guide portions 101*e* relative to the lid 210 of the cutting machine 200 for opening and closing the conveyance path 207. This reduces misalignment of the sheet S in the left-right direction relative to the conveyance path 207. The lid 210, a basic component of the cutting machine 200, is used to attach the main body 101 of the sheet feeder 100. Thus, there is no need to provide the cutting machine 200 with an extra component dedicated to attach the main body 101.

The sheet feeder 100 includes the sheet holder 300 to be attached to the cutting machine 200 and to hold a rolled sheet S. According to this configuration, a large amount of sheet S in a rolled state can be held compactly by the sheet holder 300.

Other Embodiments

The disclosure may not be limited to the above-described embodiment, and various changes may be applied therein without departing from the spirit and scope of the disclosure.

Figure 6:
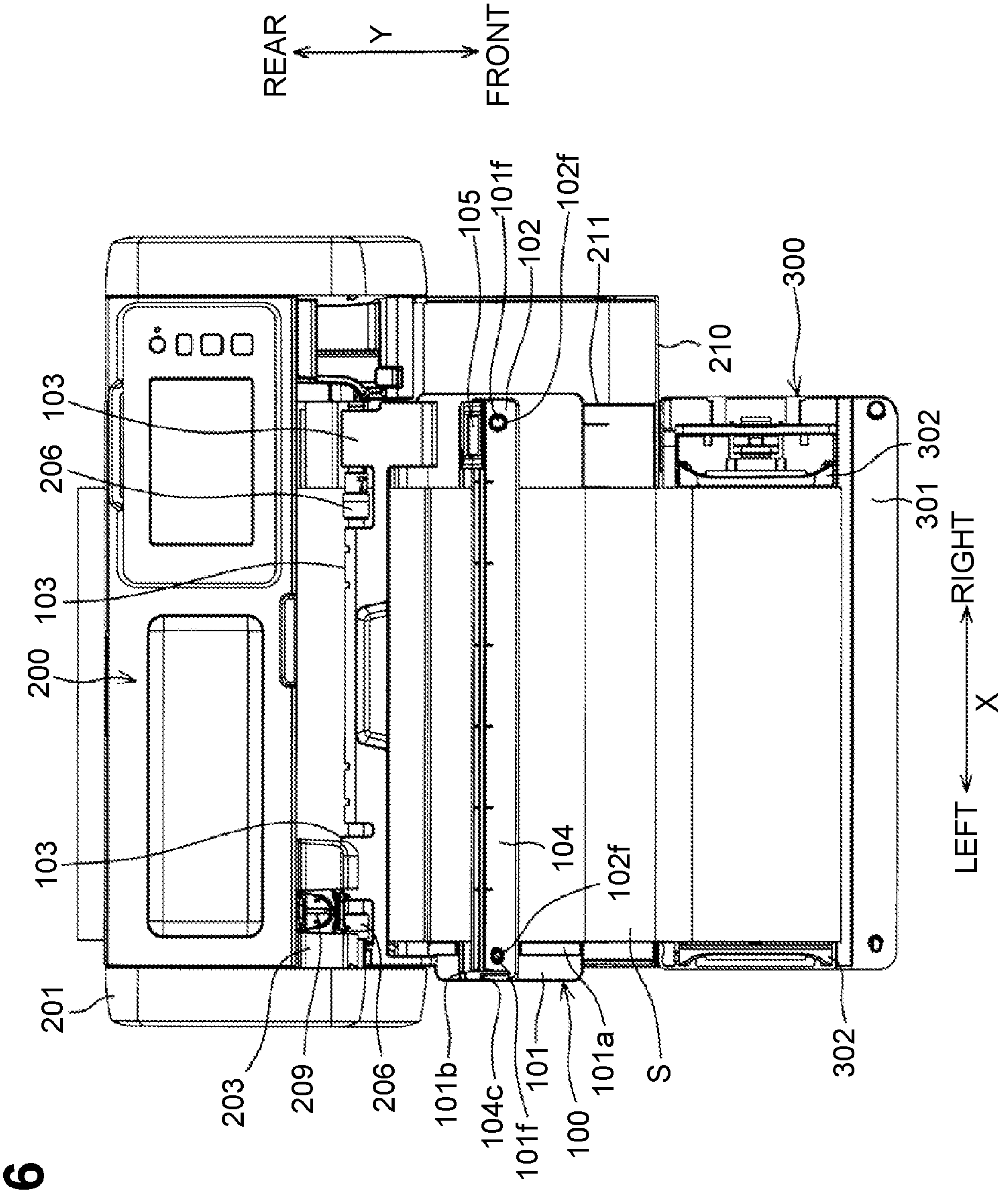
FIG. 6 is a plan view of a sheet feeder and a cutting machine according to a modification of the disclosure.

For example, as illustrated in FIG. 6, the sheet feeder 100 may include a plurality of, three in this case, attaching portions 103 provided along in the left-right direction. According to this configuration, the main body 101 can be attached to the cutting machine 200 more stably using the attaching portions 103. This enables the cutting machine 200 to cut a sheet S on the main body 101 more accurately. The attaching portions 103 may be spaced by a specified distance in the left-right direction such that at least one of small rollers 206 is sandwiched between adjacent attaching portions 103. The main body 101 can be attached to the driven roller 204 at a plurality of places in the left-right direction, and thus attached to the cutting machine 200 more stably.

In each of the attaching portions 103, the lower end of the rear restricting portion 103*a* may be located below the lower end of the driven roller 204. The main body 101 can be thus attached to the driven roller 204 more stably.

The extension portion 103*e* may be provided to the front restricting portion 103*b* or each of the rear restricting portion 103*a* and the front restricting portion 103*b*. The extension portion 103*e* provided to the front restricting portion 103*b* may be located closer to the lower end of the driven roller 204 than to the center thereof in the up-down direction, and extend toward the driven roller 204 in the front-rear direction, or toward the rear in this case. The extension portion 103*e* may be provided along in the left-right direction continuously or intermittently.

The attaching portion 103 may have a lower end defining the closed portion 103*c* and an upper end defining the open portion 103*d*, and may be configured to be attached to the driven roller 204 of the cutting machine 200 from below the driven roller 204 such that the driven roller 204 is received in the closed portion 103*c*.

The number of small rollers 206 provided on the driven roller 204 may be one or more.

Moreover, a structural component of the cutting machine 200 to which the attaching portion 103 is attached is not limited to the driven roller 204, if the component extends in a direction orthogonal to the front-rear direction which is the conveying direction of the sheet S. For example, the attaching portions 103 may be attached to the drive roller 205 such as not to face the small rollers 206 of the driven roller 204.

The processing machine to which the sheet feeder 100 is attached is not limited to the cutting machine 200 to cut a sheet S. The processing machine may be a printer, an embosser, or other machines to perform processing other than cutting.

What is claimed is:

1. A cutting system comprising a cutting machine and a sheet cutter which selectively attaches to the cutting machine, wherein the cutting machine includes:

a cutter cartridge to cut a sheet; and a lid to open and close a conveyance path through which the sheet is conveyed, wherein the sheet cutter includes:

a main body;

a cutter slidable in a first direction, the cutter to cut the sheet along in the first direction; and an attacher to attach the main body to the cutting machine, and wherein in a case where the main body is attached to the cutting machine, the main body is positioned relative to the lid, and the cutting system further comprising a third direction positioner to position the main body attached to the cutting machine in a third direction orthogonal to the first direction and a second direction orthogonal to the first direction, wherein, when the third direction positioner to come in contact with the lid to position the main body in the third direction.

2. The cutting system according to claim 1, further comprising a sheet guide portion disposed on the main body and extending in a second direction orthogonal to the first direction, the sheet guide portion to position the sheet in the first direction.

3. The cutting system according to claim 2, wherein the cutter includes a blade with an edge facing to one end of the main body in the first direction, and wherein the cutter to cut, along in the first direction, the sheet with the cutter slidingly moved from a cutting start position set at a position closer to the other end of the main body in the first direction than the sheet guide portion, toward the one end of the main body in the first direction.

4. The cutting system according to claim 1, wherein the cutter is detachable from the main body.

5. The cutting system according to claim 1, wherein the sheet cutter further includes a cutter plate extending in the first direction and holding the cutter such that the cutter is slidable in the first direction, wherein the cutter plate has a retaining portion to prevent the cutter from coming off from the cutter plate.

6. The cutting system according to claim 1, wherein the main body includes a first direction positioning portion configured to position the main body relative to the lid in the first direction.

7. The cutting system according to claim 1, wherein the sheet cutter includes a plurality of the attaching portions arranged along in the first direction.

8. The cutting system according to claim 1, further comprising a sheet holder configured to hold a roll of the sheet.

9. A cutting system comprising a cutting machine, a sheet cutter which selectively attaches to the cutting machine wherein the cutting machine includes:

a cutter cartridge to cut a sheet; and a lid to open and close a conveyance path through which the sheet is conveyed, wherein the sheet cutter includes:

a main body;

a cutter slidable in a first direction, the cutter to cut the sheet along in the first direction; and an attacher to attach the main body to the cutting machine, and wherein in a case where the main body is attached to the cutting machine, the main body is positioned relative to the lid, wherein the lid is pivoted between a blockage position where the lid is located perpendicularly at one side of the cutting machine in a second direction orthogonal to the first direction to block the conveyance path, and a release position where the lid is located horizontally at the one side of the cutting machine in the second direction to release the conveyance path, and wherein the main body is attached to the lid at the release position.

* * * * *